United States Patent [19]
Leis

[11] Patent Number: 5,368,170
[45] Date of Patent: Nov. 29, 1994

[54] POPCORN COLANDER

[76] Inventor: Alfred C. Leis, 2 Margaret St., Tiverton, R.I. 02878

[21] Appl. No.: 56,171

[22] Filed: May 3, 1993

[51] Int. Cl.$^5$ .............................................. B07B 1/46
[52] U.S. Cl. ................................... 209/680; 209/274; 209/417; 209/420
[58] Field of Search ............... 209/680, 274, 281, 417, 209/420; 99/323.5, 323.11

[56] References Cited

U.S. PATENT DOCUMENTS

| | | | |
|---|---|---|---|
| 3,170,875 | 2/1965 | Swett | 209/274 X |
| 4,457,435 | 7/1984 | Truman | 209/683 |
| 4,942,277 | 7/1990 | Narberes | 99/323.5 X |
| 5,215,196 | 6/1993 | Valls | 209/680 X |

Primary Examiner—David H. Bollinger
Attorney, Agent, or Firm—E. Michael Combs

[57] ABSTRACT

A colander structure is arranged of a generally semispherical configuration to include a matrix of first apertures directed therethrough of a first width, with a plurality of annular arrays of second apertures extending from a floor portion of the colander, wherein the second apertures are of a second width substantially greater than the first width to permit the reception of popcorn kernels therethrough to eliminate such kernels, with only fully expanded popcorn components remaining within the colander structure.

3 Claims, 4 Drawing Sheets

FIG. 1
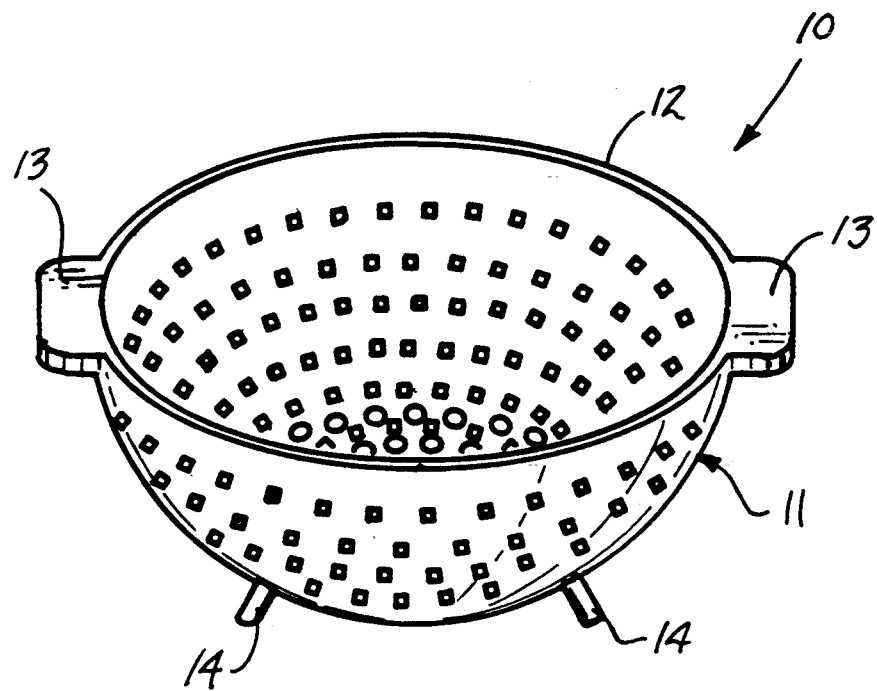
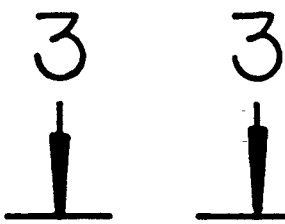
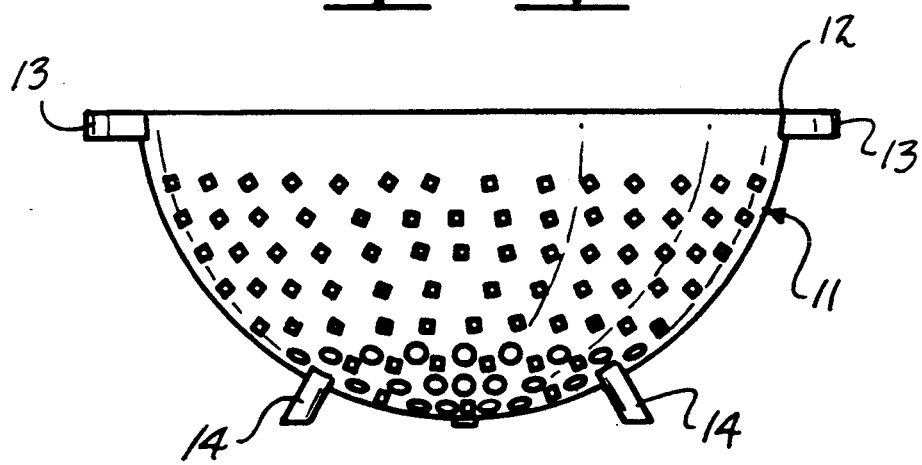
FIG. 2

POPCORN COLANDER

BACKGROUND OF THE INVENTION

1. Field of the Invention

The field of invention relates to colander structure, and more particularly pertains to a new and improved popcorn colander wherein the same is directed to the permitting of passage of unexpanded kernels for reception through the colander for elimination of such kernels.

2. Description of the Prior Art

Colander structure of various types are utilized throughout the prior art as exemplified by the U.S. Pat. No. 4,075,105. The U.S. Pat. Nos. 4,963,374 and 4,457,435 are examples of the prior art kernel separator structure relative to the use of popcorn.

The instant invention attempts to overcome deficiencies of the prior art by providing for a convenient unitary structure arranged for the separation of unexpanded popcorn kernels relative to fully expanded popcorn members and in this respect, the present invention substantially fulfills this need.

SUMMARY OF THE INVENTION

In view of the foregoing disadvantages inherent in the known types of colander structure now present in the prior art, the present invention provides a popcorn colander wherein the same is directed to the use of a body having a plurality of first and second apertures, with the second apertures permitting passage of unpopped popcorn kernels therethrough. As such, the general purpose of the present invention, which will be described subsequently in greater detail, is to provide a new and improved popcorn colander which has all the advantages of the prior art colander structure and none of the disadvantages.

To attain this, the present invention provides a colander structure arranged of a generally semi-spherical configuration to include a matrix of first apertures directed therethrough of a first width, with a plurality of annular arrays of second apertures extending from a floor portion of the colander, wherein the second apertures are of a second width substantially greater than the first width to permit the reception of popcorn kernels therethrough to eliminate such kernels, with only fully expanded popcorn components remaining within the colander structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved popcorn colander which has all the advantages of the prior art colander structure and none of the disadvantages.

It is another object of the present invention to provide a new and improved popcorn colander which may be easily and efficiently manufactured and marketed.

It is a further object of the present invention to provide a new and improved popcorn colander which is of a durable and reliable construction.

An even further object of the present invention is to provide a new and improved popcorn colander which is susceptible of a low cost of manufacture with regard to both materials and labor, and which accordingly is then susceptible of low prices of sale to the consuming public, thereby making such popcorn colanders economically available to the buying public.

Still yet another object of the present invention is to provide a new and improved popcorn colander which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the invention.

FIG. 2 is an orthographic side view of the invention.

DESCRIPTION OF THE PREFERRED EMBODIMENT

Figure 3:
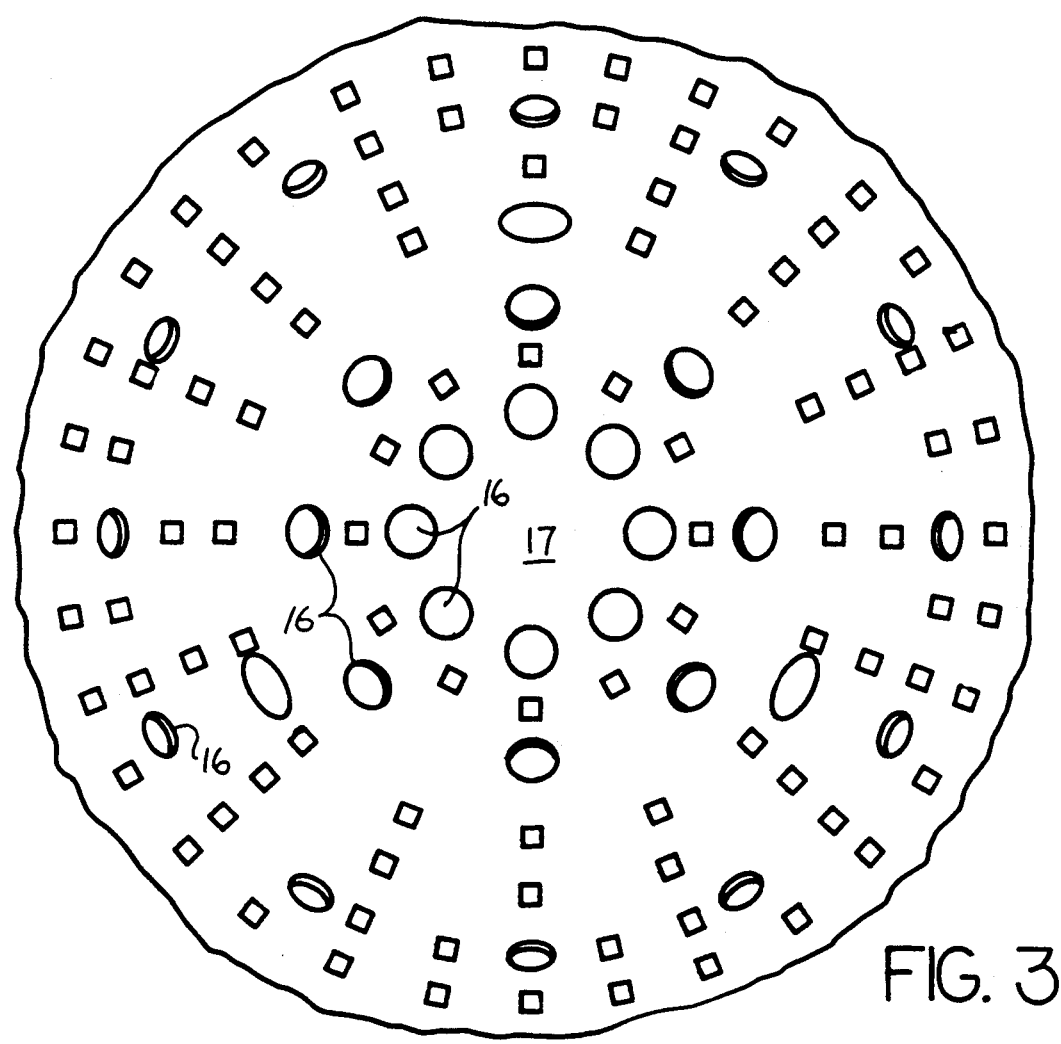
FIG. 3 is an orthographic view, taken along the lines 3—3 of FIG. 2 in the direction indicated by the arrows.
Figure 4:
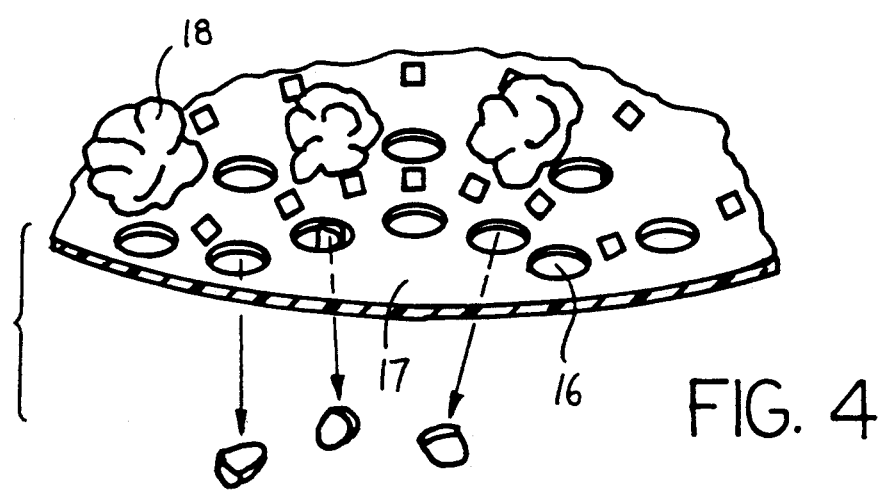
FIG. 4 is an enlarged isometric illustration of the floor portion of the colander structure.

With reference now to the drawings, and in particular to FIGS. 1 to 8 thereof, a new and improved popcorn colander embodying the principles and concepts of the present invention and generally designated by the reference numeral 10 will be described.

More specifically, the popcorn colander 10 of the instant invention essentially comprises a rigid semi-cylindrical body 11 having an annular entrance end wall 12, with handle members 13 diametrically oriented relative to one another extending exteriorly of the body 11 relative to and in adjacency the end wall 12. Radially projecting support legs 14 fixedly mounted to the exterior surface of the body 11 extend beyond the exterior surface for support of the structure, with a predetermined number of such support legs 14 provided, with the support legs 14 extending about a colander floor 17, such as indicated in FIG. 3, that is oriented medially of the colander. A matrix of first openings 15 are directed through the body 11 of a first width. Such first width is nominally of one-eighth inch to three-sixteenth inch. A plurality of annular arrays of second openings 16 are provided, with at least one of said annular arrays position in surrounding relationship relative to the floor 17, with further such arrays extending through the body 11 in adjacency to the floor. The second openings 16 are of a second width typically equal to five-sixteenths of one inch, wherein the second width is greater than said first width to permit the reception of popcorn kernels 19 therethrough, with expanded popcorn 18 remaining within the colander. The first openings therefore permit the cooling and drainage of such popcorn 18 in use.

Figure 5:
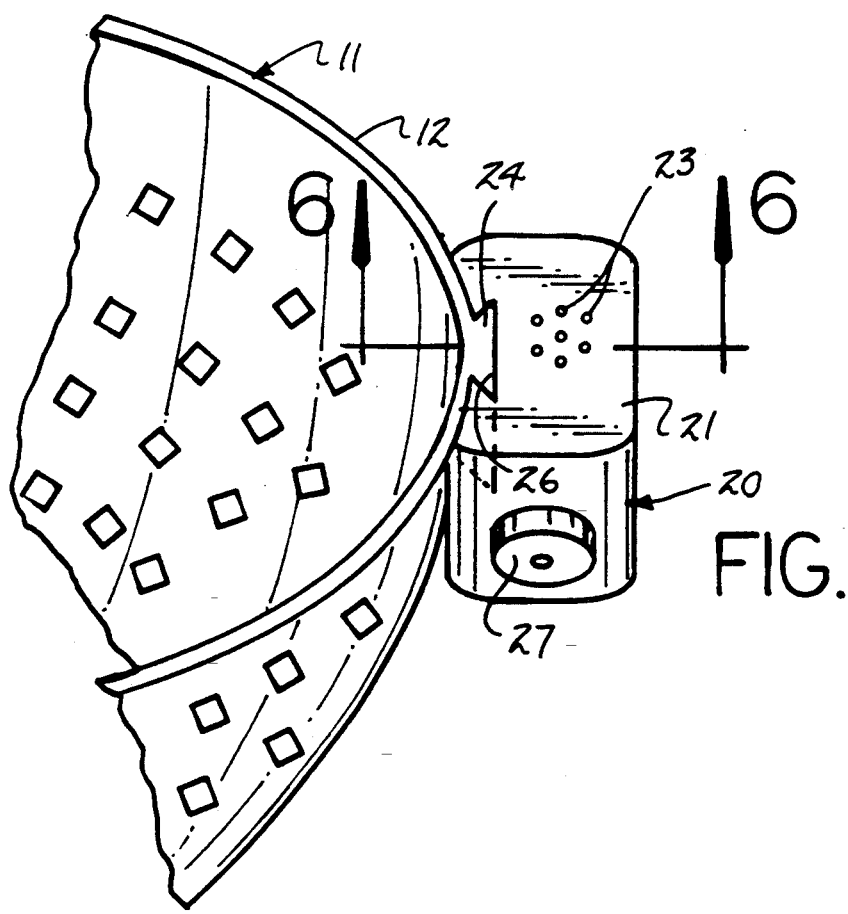
FIG. 5 is an isometric illustration of the invention further employing a salt shaker structure.
Figure 6:
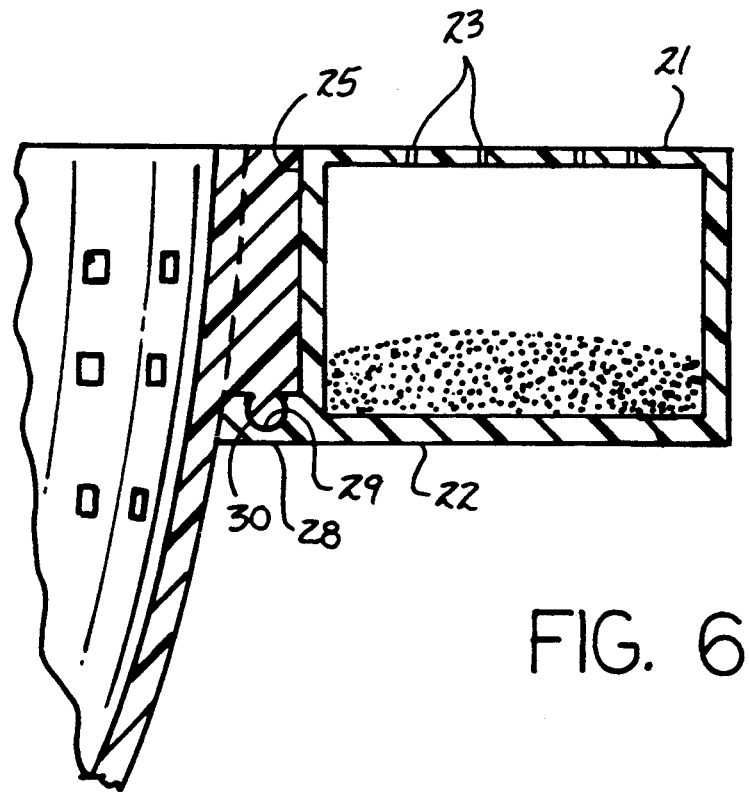
FIG. 6 is an orthographic view, taken along the lines 6—6 of FIG. 5 in the direction indicated by the arrows.
Figure 7:
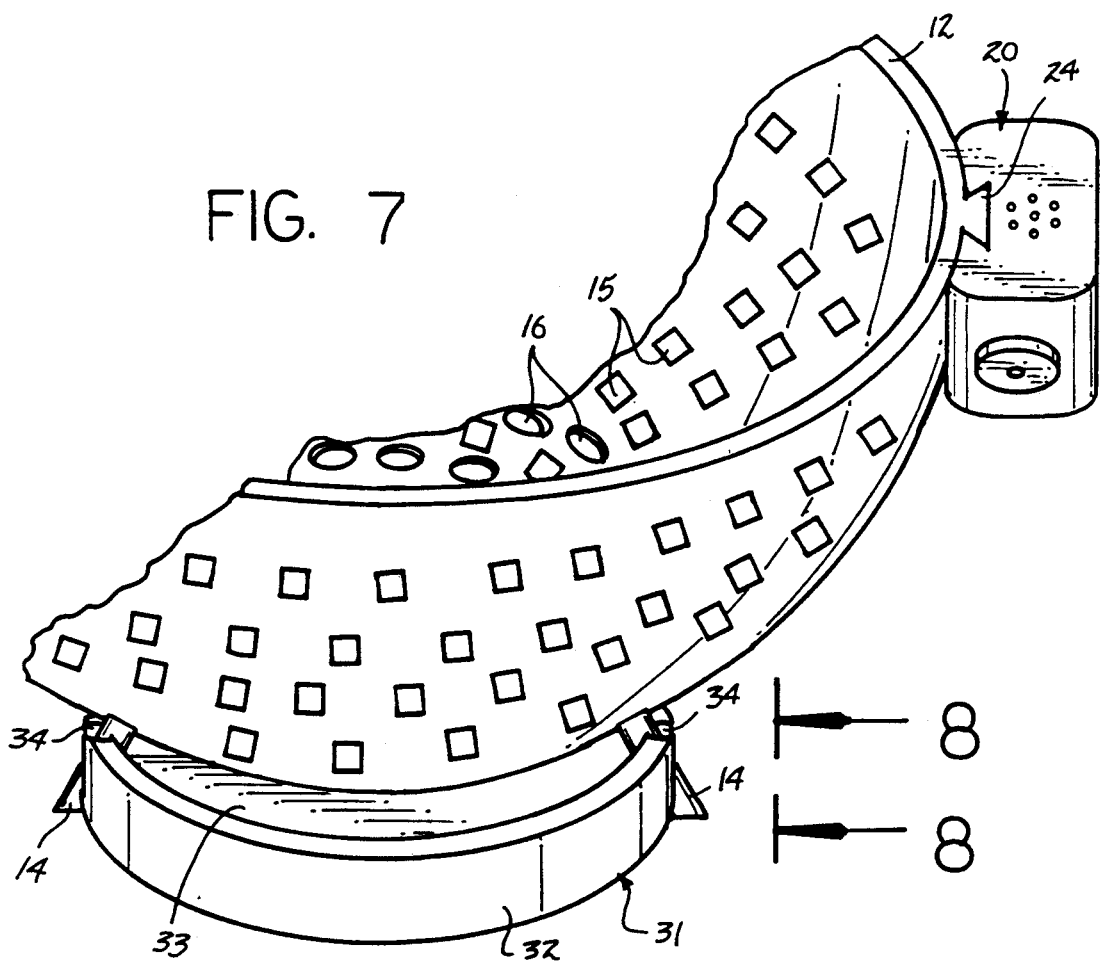
FIG. 7 is an isometric illustration of the invention further employing a tray structure.

The FIGS. 5 and 6 indicates the use of a housing 20 removably mounted relative to an exterior surface of the body 11, wherein the housing 20 includes a housing top wall 21 spaced from a housing bottom wall 22, as well as at least one housing side wall 25. The housing top wall 21 includes a plurality of top wall openings 23, wherein the housing is formed with a housing cavity accessed through a fill cap 27 through an end wall to permit the replenishment of granular salt within the cavity for use and application upon the popcorn 18 in a convenient positioned orientation relative to the body 11. A trapezoidal boss 24 is fixedly mounted to the exterior surface of the body 11 extending from the annular entrance end wall 12, with the trapezoidal boss 24 of a generally parallelepiped configuration arranged for reception within a trapezoidal slot 26 directed into the at least one housing side wall 25. As illustrated in FIG. 5, the housing bottom wall 22 includes a resilient bottom wall flange 28 projecting orthogonally relative to the side wall 25, with the bottom wall flange 28 having a semi-spherical recess 29 arranged for reception of a semi-spherical projection 30 mounted to a lowermost end of the trapezoidal boss 24. In this manner, as the flange 28 is resilient, it accommodates the projection to secure the housing 20 relative to the trapezoidal boss 24 prior to use of the housing as dispensing of salt therefrom.

Figure 8:
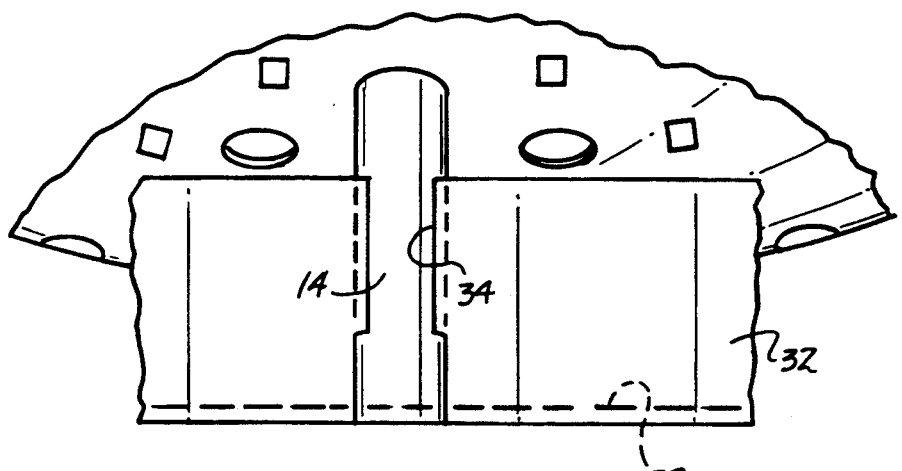
FIG. 8 is an orthographic view, taken along the lines 8—8 of FIG. 7 in the direction indicated by the arrows.

The FIG. 8 indicates the further use of a receiving tray 31, with the receiving tray 31 having a resilient side wall 32 and a tray floor 33. The resilient side wall 32 includes a plurality of side wall slots 34 equal to said predetermined number, with each of the slots arranged to receive and engage one of the support legs 14 to secure the tray in adjacency to and below the floor 17 for accommodating the popcorn kernels directed through the second openings 16. To this end, the tray is positioned coextensive and below the second openings.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention.

What is claimed as being new and desired to be protected by LETTERS PATENT of the United States is as follows:

1. A popcorn colander, comprising,
    a rigid semi-spherical body, having an annular entrance end wall and a floor, with the floor oriented medially of the body, and
    a plurality of support legs projecting radially relative to the body In surrounding relationship about the floor, and
    a matrix of first openings directed through the body having a first width, and
    a plurality of second openings directed through the body, wherein the second openings are arranged In a surrounding relationship relative to the floor and extend through the body in adjacency to the floor,
    wherein the body include a boss mounted to an exterior surface of the body, wherein the boss extends from the entrance end wall, and a housing, the housing having a top wall spaced from a bottom wall, and at least one side wall, with the at least one side wall having a slot receiving said boss, the housing further having a cavity and the top wall including a matrix of apertures directed therethrough for dispensing of granular material within the cavity.

2. A popcorn colander as set forth in claim 1 wherein the bottom wall includes a resilient flange projecting beyond the at least one side wall, the resilient flange having a semi-spherical recess, and the trapezoidal boss including a semi-spherical projection arranged for reception within said recess.

3. A popcorn colander as set forth in claim 2 including a receiving tray, the receiving tray having a resilient side wall and a floor, with the resilient side wall including a plurality of side wall slots, with each of said slots arranged to resiliently receive and engage one of said support legs directed through the resilient side wall.

* * * * *